Jan. 15, 1952 M. COLAS 2,582,768

FREQUENCY TRANSPOSING DEVICE

Filed March 29, 1946 3 Sheets-Sheet 1

INVENTOR.
MARCEL COLAS
BY
Haseltine Lake & Co.
AGENTS

INVENTOR.
BY MARCEL COLAS
Haseltine Lake & Co.
AGENTS

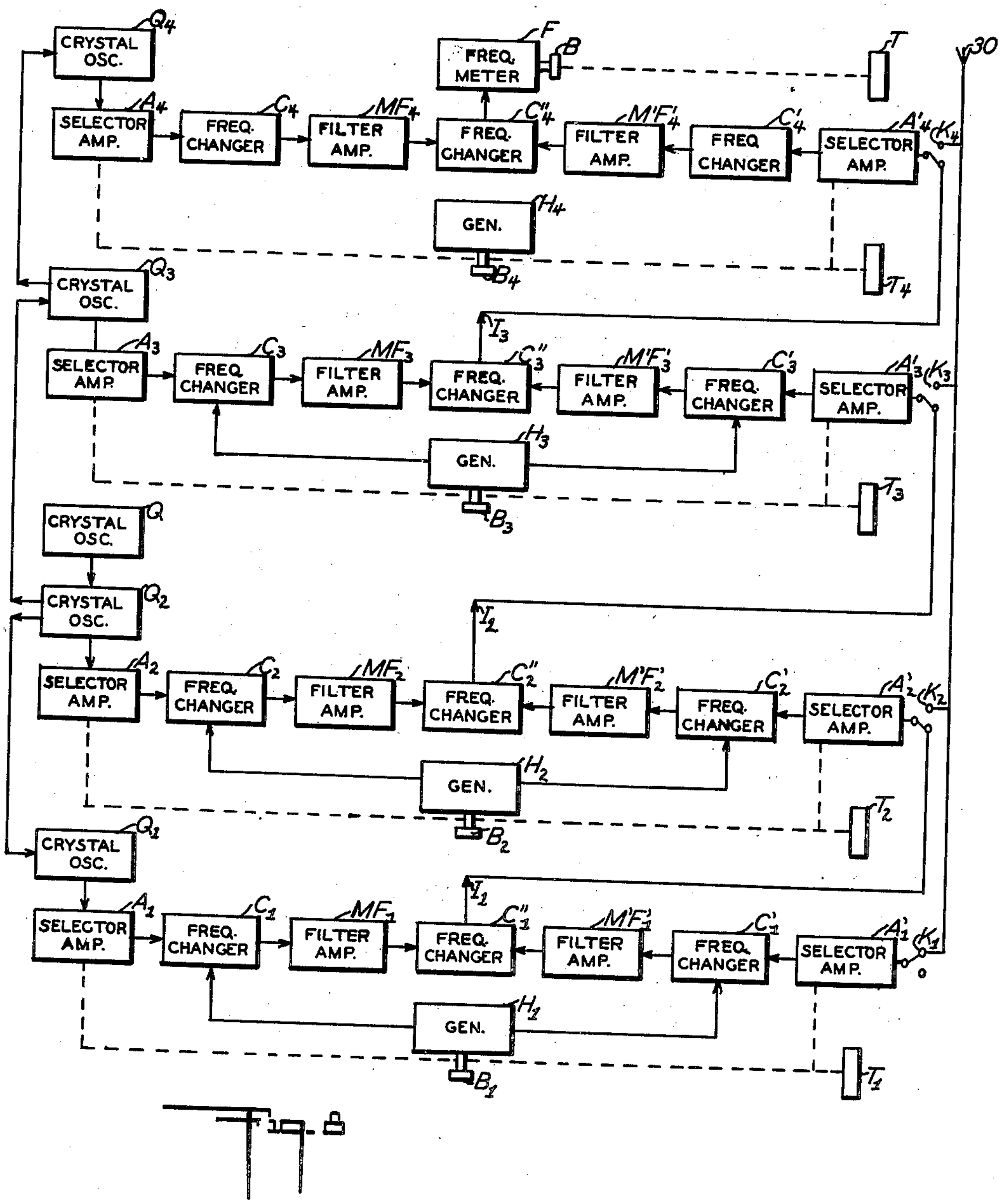
INVENTOR.
MARCEL COLAS
BY
Haseltine Lake & Co
AGENTS

Patented Jan. 15, 1952 2,582,768

UNITED STATES PATENT OFFICE 2,582,768

FREQUENCY TRANSPOSING DEVICE

Marcel Colas, Malakoff, France, assignor, by mesne assignments, to Compagnie Generale De Telegraphie Sans Fil, Paris, France, a corporation of France Application March 29, 1946, Serial No. 658,159
In France July 19, 1944

Section 1, Public Law 690, August 8, 1946
Patent expires July 19, 1964

9 Claims. (Cl. 250—36)

The present invention relates to frequency transposing devices such as those used in frequency generators, transmitters, receivers, frequency-meters etc., operating over an extended range of frequency and in which the regulation over the frequency of operation may be effected with precision over a comparatively restricted range (termed the interpolation range), due to frequency changes carefully operated by means of stable frequencies arising from a generator of harmonics the basic frequency of which is furnished by a very stable oscillator, for example of quartz.

In order to obtain great precision in regulation, it is necessary to choose a somewhat low basic frequency but the selection of a satisfactory frequency then becomes, after the change of frequency, almost impossible with known devices, because the satisfactory frequency differs very little, in percentage, from the harmonic employed.

The device according to the present invention enables this difficulty to be overcome, by employing at least three frequency changers, one of which is connected to an interpolation selector covering the range of interpolation, and to the two other frequency changers, through the intermediary of two medium frequency selectors, which furthermore are each connected to the same auxiliary generator and respectively one to a selector of harmonics drawn from a stabilised frequency generator, and the other to a high frequency selector covering the extended range of the frequencies of operation, the changes of frequency in the three frequency changers being such that the frequency selected by the high frequency selector is equal to the algebraic sum of the frequency selected by the selector of harmonics, and of the frequency selected by the interpolation selector.

The invention will be more particularly described with reference to the accompanying drawings representing by way of non-restrictive examples, various methods of carrying the invention into effect and in which:

Figures 4 to 6 illustrate diagrammatically devices which can be employed for the measurement of frequency or the reception of telegraphic signals; and Figures 7 and 8 illustrate diagrammatically devices which can be employed in the measurement of frequency or for reception with pre-regulation.

Figure 1:
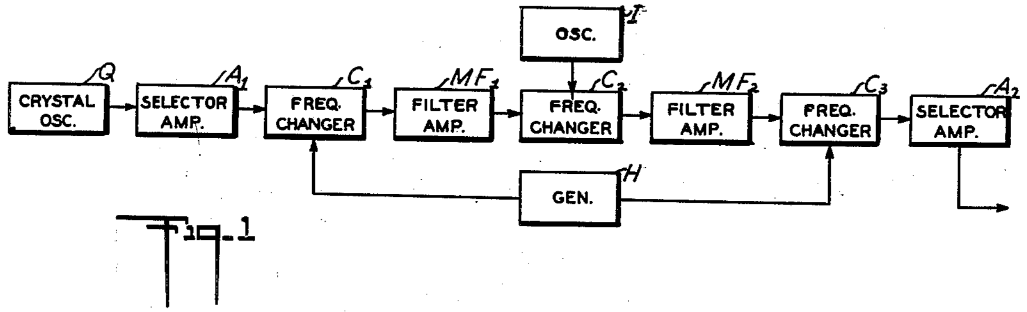
Figures 1 to 3 illustrate diagrammatically devices which can be employed as frequency generators.

Referring to Figure 1, a very stable frequency oscillator Q of, for example, piezo-electric quartz provided with an extractor of harmonics furnishing a regular scale of frequencies, is followed by a selector amplifier $A_1$ which will hereinafter be referred to as a selector of harmonics and which allows the passage of the desired harmonic, whilst sufficiently weakening the adjacent harmonics.

A frequency changer $C_1$ is arranged to receive, on the one hand, the oscillation in particular of the selector of harmonics $A_1$, and, on the other hand, the oscillations of the auxiliary free generator H. The resulting mean frequency, selected equal to $MF_1$, is selected and amplified by a filter-amplifier $MF_1$ which will hereinafter be referred to as the mean frequency selector. Furthermore, an oscillator I hereinafter referred to as an interpolator of adjustable frequency is so constructed that its frequency is of the utmost possible stability and covers a range equal to the interval comprised between two successive harmonics of the generator Q.

A second frequency changer $C_2$ receives the frequency filtered by the mean frequency selector $MF_1$ as also the frequency derived from the interpolator I. The resulting frequency $MF_2$, comprised in an interval equal to that of the interpolator, is selected and amplified in a filter-amplifier $MF_2$ which will hereinafter be referred to as a mean frequency selector.

Finally, a frequency changer $C_3$ receives the oscillation filtered by the mean frequency selector $MF_2$ as also an oscillation taken from an auxiliary generator H. One of the resultant frequencies is selected and amplified by a filter amplifier $A_2$ which covers the desired range of frequency and will be hereinafter referred to as a high frequency selector.

If N is the degree of the harmonic employed, S the output frequency of the system, and $MF_1$ and $MF_2$ the frequencies filtered respectively by the mean frequency selectors $MF_1$ and $MF_2$, it will be appreciated that there is obtained between the various frequencies one of the undermentioned groups of relations, either:

$$MF_1=NQ-H$$
$$MF_2=MF_1+I$$
$$S=MF_2+H$$

whence there is obtained:

$$S=NQ+I$$

or $$MF_1=H-NQ$$
$$MF_2=MF_1-I$$
$$S=H-MF_2$$

from which results:

$$S=NQ+I$$

Generally, it is seen that between the different frequencies referred to above, there exists the following relationship:

$$S=\pm NQ\pm H\pm I\pm H$$

It will be so arranged that after the three frequency changes, the frequency H disappears, or, what comes to the same thing, $$S=NQ\pm I$$

Thus, the frequency H of the auxiliary generator disappears completely from the final frequency which is then composed of a very stable part NQ emanating from a quartz oscillator and a part I coming from a free generator. By suitably adjusting the quantities NQ and I any desired stability can be obtained for the final frequency.

As has just been stated, the auxiliary generator H does not play any part in the stability of the final frequency; it must nevertheless be sufficiently stable for the resultant frequency $MF_1$ to remain in the range of permeability of the mean frequency selector $MF_1$. Furthermore, there can be employed a frequency regulator controlled by the residual variations of $MF_1$ in order to correct the frequency H and keep it within the desired limits. The auxiliary generator H serves nevertheless to select the harmonic NQ; its graduation must therefore be effected with great care.

In order that the invention may be more clearly understood there will be hereafter given a numerical example which is intended in no way to limit the scope of the invention.

Assuming that a continuous range of frequency from 3000 to 22,000 kcs. is desired, there will be given to the various elements the following values.

The quartz oscillator will have a frequency of 1000 kcs.; the extractor of harmonics will furnish all the frequencies in steps of 100 kcs. up to 22,000 kcs. MF may be taken as equal to 800 kcs. which will enable the selection of the image frequency of the first mixer $C_1$ to be obtained easily in the selector-amplifier of harmonics $A_1$. The auxiliary generator H will cover the range from 2100 to 21,100 kcs. and the interpolator oscillator I will have a range of 100 to 200 kcs. Supposing this has a stability of frequency of 1/1,000, the absolute error in its frequency will not exceed 200 kcs.

The frequency $MF_2$ will be in the range between 900 and 1000 kcs. and will be easily selected by a suitable filter. Finally, the final frequency S will be in the range between 300 and 22,000 kcs.

The composed frequencies of the last frequency changer are separated from the component frequency H by at least 900 kcs. and may be easily selected, the relative frequency separation being 900/22,000, or about 4%.

The method to be adopted in selecting a definite output frequency is as follows:

Assuming an output frequency of 13,243.5 kcs. has to be obtained. The generator H will be regulated to the frequency 12,300 kcs. and the interpolator I to the frequency 143.5 kcs. The harmonic of 131st order of the quartz, that is to say, the frequency 13,100 kcs. will be found to be selected by the selector of harmonics $A_1$ tuned to this frequency and will furnish a mean frequency of 800 kcs. The frequency $MF_2$ will then be equal to 800+143.5=943.5 kcs. and the final frequency will be 943.5+12,300=13,243.5 which is the value required.

To simplify the manipulation of the apparatus, there will be marked on the scales of the generators H and I the values 13,200 and 43.5 respectively for the positions corresponding to the frequencies 12,500 kcs. and 143.5 kcs. effectively produced. There will be obtained, by simple reading for example on a meter, the final output frequency. With a view to still further facilitate the manipulation of the apparatus, there may be adopted a single control for the tuning members of the selector amplifiers $A_1$, $A_2$ and of the generator H, as is done with single control frequency change receivers.

It is to be noted that the output frequency of the high frequency selector amplifier $A_2$ always differs from that of the selector amplifier of harmonics $A_1$ by at least 100 kcs.; this is very good and avoids all reaction of one amplifier on the other.

The method which has just been described is capable of generalisation in various ways.

Figure 2:
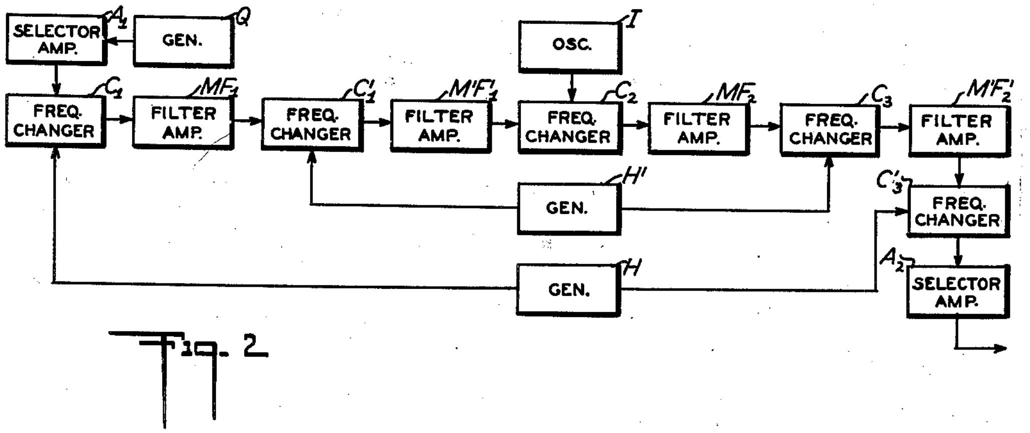

For harmonics of a higher rank than those which have been indicated in the above numerical example, the selection of the useful frequency would not be so easy. There can then be used a double change of frequency before effecting the interpolation by modulation. Naturally, the final frequency will be obtained by two successive frequency changes, for which there will be employed the same local oscillators H and H'. Such an arrangement is shown by Figure 2.

Two modifications may be envisaged. The first consists in leaving the oscillator H' fixed, as also the mean frequency selector amplifiers $MF_1$ and $M'F'_1$, $MF_2$ and $M'F'_2$. The regulation will then take place simply by manipulating H and I.

The second modification consists in successively regulating H and H' by making the mean frequency selectors $MF_1$ and $M'F'_2$ variable. There can then be obtained a staggered regulation and the various tens of the decimal numbering of the final frequency can be caused to appear.

These combinations could be placed in operation either for frequencies higher than those which have been indicated in the preceding example, or for the same frequencies by using a generator Q of lower frequency (of example, of 10 kcs.), which would give much closer harmonics. In this case, the interpolator I would cover the range of 10 to 20 kcs. and the precision on the final frequency would be ten times greater.

Figure 3:
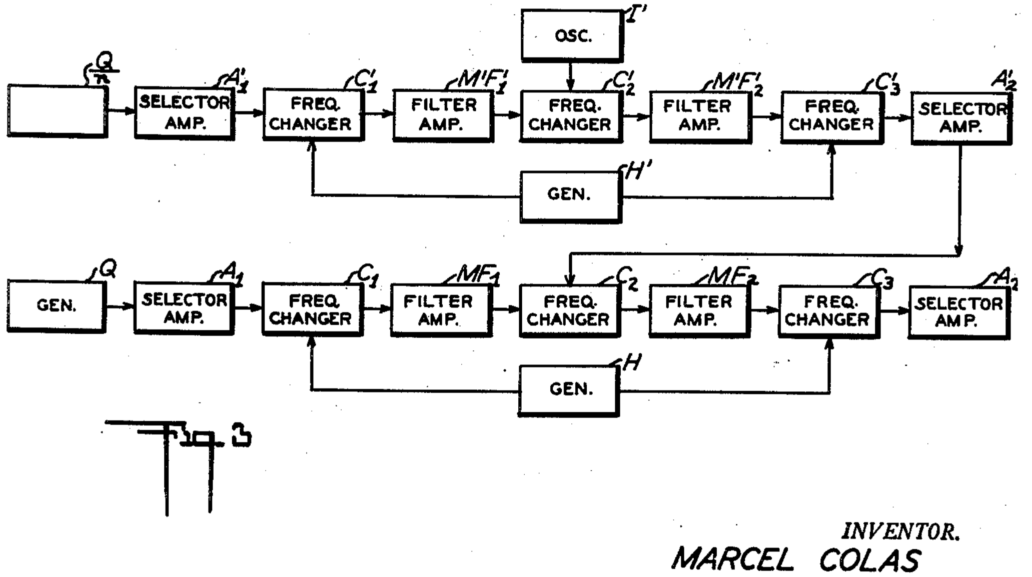

The method according to the present invention can be applied in a different way by forming the interpolator I of a complete system having a similar constitution. This combination is represented by the Figure 3. The elements Q, $A_1$, $C_1$, $MF_1$, $C_2$, $MF_2$, $C_2$, $A_2$, H are formed identically with the corresponding elements of Figure 1. As regards the interpolator I, this is replaced by the complete system formed by the elements $Q/n$, $A'_1$, $C'_1$, $M'F'_1$, $C'_2$, $M'F'_2$, $C'_3$, $A'_2$, $H'$, $I$, operating on a lower frequency $Q/n$ with a similar constitution. The selector amplifier of high frequency $A'_2$ plays exactly the same part as the interpolator I in the same range of frequencies.

There would preferably be chosen $n=10$, which would allow of grading or adjusting H, H' and I' according to the decimal fractioning of the final frequency $A_2$. The precision obtained on $A_2$ would, in this case, be ten times greater. The manipulation could again be simplified by means of a single control, the manipulations, in this case, being reduced to the regulation of the generators H, H' and I'.

Figures 4, 5, 6, 7:
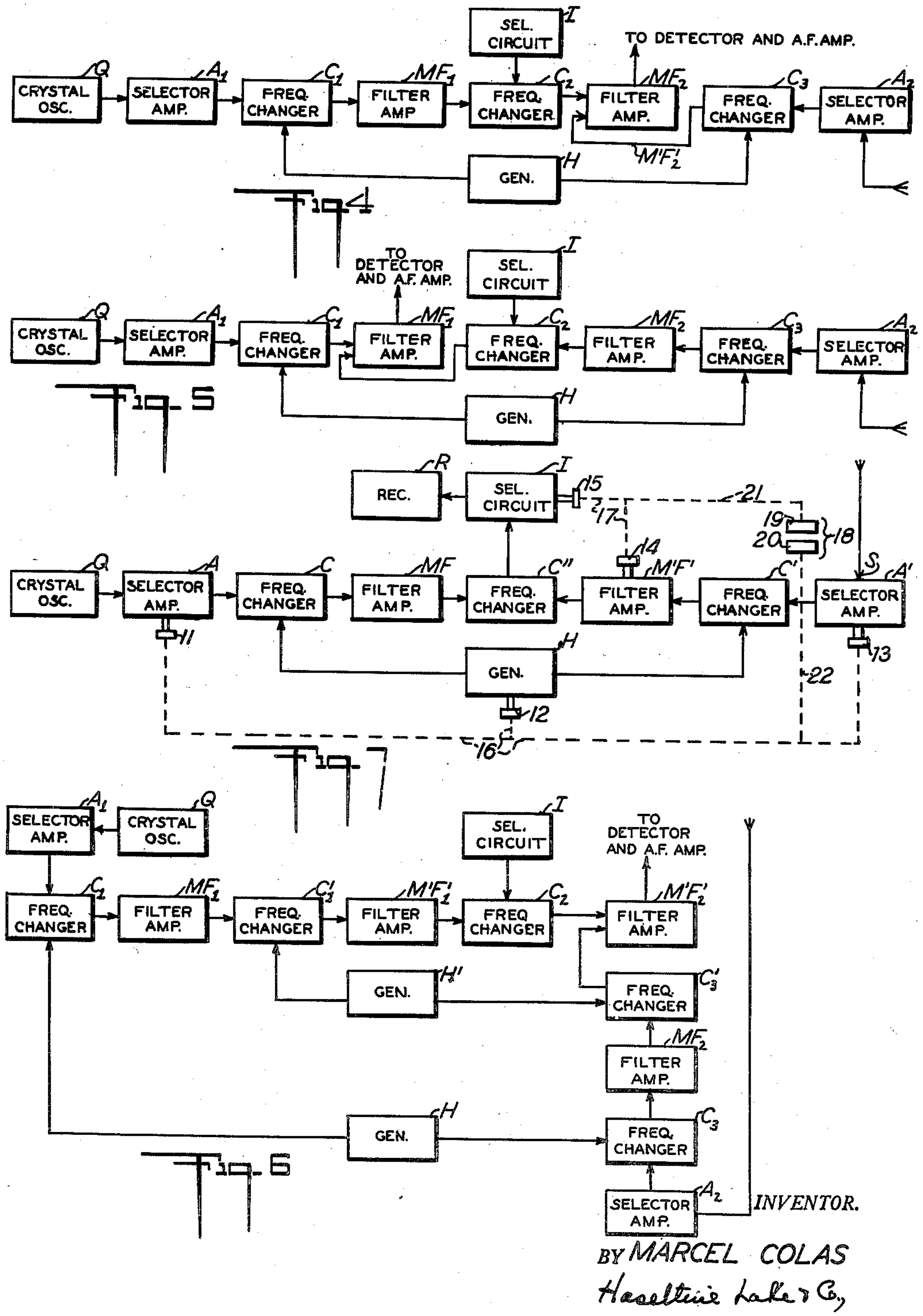

The invention is shown in Figure 4 as applied to a receiver of telegraphic signals or to a frequency meter. Referring to Figure 4 a very stable oscillator Q for example of piezo-electric quartz, furnishing a regular scale of harmonic frequencies, is followed by a selector amplifier of harmonics $A_1$ covering the range of the useful frequencies; a frequency changer $C_1$ receives the oscillation issuing from the selector of harmonics $A_1$ as also that of an auxiliary free generator H; the resulting mean frequency, selected at a certain value $MF_1$ is chosen and amplified by a selector amplifier $MF_1$ of mean frequency.

On the other hand, an interpolator oscillator of adjustable frequency I is designed in such manner that its frequency indicated by I is of the utmost stability, and covers a range comprised between two successive harmonics of the generator Q.

A second frequency changer $C_2$ receives the output of the mean frequency selector amplifier $MF_1$ as also that of the interpolator I; the resultant frequency $MF_2$ comprised in an interval equal to that of the interpolator is chosen and amplified in a mean frequency selector amplifier $MF_2$, which is of adjustable frequency and the control of which is effected at the same time as that of the interpolator I.

A high frequency selector amplifier $A_2$ is excited by the receiving aerial. A third frequency changer $C_3$, which receives the oscillation issuing from the high frequency selector amplifier $A_2$, having the frequency S of the signal as also that of the auxiliary generator H furnishes a certain mean frequency $M'F'_2$ which is passed to the inlet of the amplifier $MF_2$. The latter is completed by a detector and eventually by a low frequency amplifier, not shown, these two members being intended to detect the beats which are produced between the frequency $MF_2$ coming from the quartz, and the frequency $M'F'_2$ coming from the signal.

Now between the various frequencies, one or the other of the two following groups of relationships exist:

either $$M'F'_2=S-H$$
$$MF_1=NQ-H$$
$$MF_2=MF_1+I$$
$$=NQ-H+I$$

or $$M'F'_2=H-S$$
$$MF_1=H-NQ$$
$$MF_2=MF-I$$
$$=H-NQ-I$$

where NQ indicates the frequency taken from the oscillator Q.

If $MF_2$ is brought so as to be equal to $M'F'_2$ by regulating the value of I, in order to bring the beats to zero, there will result:

$$S-H=NQ-H+I \text{ whence } S=NQ+I$$

or $$H-S=H-NQ-I \text{ whence } S=NQ+I$$

It will be seen therefore that the frequency of the auxiliary generator H disappears from the final result as in the case of the generator of Figure 1.

It is to be noted that the elements $A_2$, $C_3$, H and $MF_2$ constitute a complete receiver capable of serving for all normal uses. The whole apparatus according to Figure 4 may serve in particular for effecting as desired either the pre-regulation of the receiver to a given frequency, or to measure the frequency of a signal.

As regards the pre-regulation of the receiver to a given frequency, it is sufficient to regulate H for the harmonic N of the oscillator Q to be effectively unemployed and then to regulate I, bringing about at the same time the regulation of the mean frequency selector amplifier $MF_2$. The mean frequency selector amplifier $MF_2$ will be arranged to receive a signal of frequency $S=NQ+I$; the auxiliary generator furnishing the frequency H.

Actually, H is first regulated so that the harmonic NQ is centred in the narrow passing band of $MF_1$, and then $MF_2$ is shifted by the amount I so that the signal $S=NQ+I$ is in the passing band of $MF_2$.

By retaining a displacement of 1,000 periods, for example, in the regulation of the receiver, there will undoubtedly be attained an audible beat with the frequency signal S. The whole is then ready to receive telegraphic signals.

As regards the measurement of the frequency of a signal, it is convenient to operate as follows.

The interpolator I and, consequently, the mean frequency selector amplifier $MF_2$ are placed on the minima of their range. H is regulated to seek the given emission; the regulation of H thus obtained is disposed between the harmonics NQ and $(N+1)Q$. H is brought back to the regulation corresponding to NQ; at this moment the harmonic of rank N passes alone into the mean frequency selector $MF_1$. Finally, I is regulated and consequently the mean frequency selector amplifier $MF_2$, to pick up the emission which then beats with the signal issuing with the oscillator Q. The beat is then reduced to zero and the frequency sought is equal to $NQ=I$. The total precision obviously depends upon the constants of construction connected with the terms NQ and I.

In order that the preceding description may be more clearly understood, numerical examples will be given which naturally are merely by way of example and are not intended to limit the scope of the invention.

Assuming that a constant range of frequency from 3000 to 22,000 kcs. has to be produced. There will be allocated to the various elements, the following values.

The quartz oscillator will have a frequency of 100 kcs., the generator of harmonics will furnish all the frequencies in hundreds of kcs. up to 22,000 kcs. $MF_1$ will be taken as 800 kcs. which will permit of easily effecting in the selector amplifier of harmonics $A_1$ the selection of the image frequency of the first mixer $C_1$. The auxiliary generator H will cover the range of 2100 to 21,100 kcs. and the interpolator I will have a range of 100 to 200 kcs. The mean frequency selector $MF_2$, the width of which may be several kcs. will have its frequency adjustable between 900 and 1,000 kcs. by a single control common to the interpolator I.

Under the above conditions, let it be assumed that a frequency of 13,243.5 kcs. is to be received.

It is sufficient to regulate the generator H to the frequency 12,300 kcs. The mean frequency $M'F'_2$ resulting from the signal and from the heterodyne H, will be 943.5 kcs. and the mean frequency $MF_1$ resulting from the harmonic 131 of the quartz will be 800 kcs. By regulating the interpolator 1 to 142.5, which entails the regulation of the mean frequency selector amplifier $MF_2$ to 942.5, the frequency $MF_2$ which issues from the quartz will be 942.5 and will furnish a beat of 1,000 periods with $M'F'_2$, issue of the signal. The receiver is thus ready to take up later on the desired frequency.

Under the same conditions, let there be the frequency of an incident signal to be measured with which is a priori unknown, but which will have the value 13,243.5 kcs. mentioned above.

Th interpolator I being placed on 100 kcs. and consequently $MF_2$ on 900 kcs. the auxiliary generator H is regulated to receive the given emission. Its frequency is then 12,343.5 and corresponds to the harmonics 131 and 132 of the quartz (13,100−800=12,300; 13,200−800=12,400). By bringing H to the value 12,300, the frequency $M'F'_2$ will have a value of 943.5. The harmonic used will naturally be the 131st of frequency 13,100 and will furnish $MF_1$=800. On seeking the emission by manipulating I, this latter will be found with the regulation corresponding to 943.5 kcs., which gives to I the value 143.5 kcs. to obtain the beat 0. The frequency has as its value 13,100+143.5=13,243.5 kcs.

In order to simplify the manipulation of the apparatus, there will be marked on the scale of the generators H and I the values 13,200 and 43.5 respectively for the positions corresponding to the frequencies 12,300 and 143.5 actually produced. There will be obtained, by simple reading on a meter, for example, the final frequency of reception. In order to facilitate still further the manipulation, a single control can be arranged for the tuning members of the selector amplifiers $A_1$ and $A_2$ and of the generator H, as is done in the receivers with change of frequency with single control.

Figure 5 represents a modification of the arrangement in Figure 4. The members are the same as those previously described; only reception takes place on the mean frequency selector amplifier $MF_1$ instead of taking place on the mean frequency selector amplifier $MF_2$. This latter may be a filter amplifier, the band width of which extends over the interval disposed between two successive harmonics. The method of regulating is otherwise the same as in the case of Figure 4.

The process which has just been described is capable of generalisation in various ways.

Thus, for harmonics of higher rank than those which have been indicated in the numerical example given above, the selection of the useful frequency will not be as easy. There can then be used a double change of frequency before effecting the interpolation. Naturally, the operator will listen to the signal by two successive changes of frequency, for which there will be used auxiliary oscillators H and H'. Such an arrangement derived from Figure 4 is shown in Figure 6. Naturally there could also be used an arrangement derived from Figure 5.

Likewise, in a further modification the interpolator I could be replaced by a complete generator unit of great precision. The precision given by a unit thus constituted would then be still higher.

Referring to Figure 7 there is shown a device basically suitable to operate either as a frequency meter or as a receiver with pre-regulation. This device is, to a large extent, similar to that illustrated in Figure 4, and it will be seen that the designation of the component elements is analogous to that in Figure 4. Here, Q designates a harmonic generator constituted by a very stable oscillator such as that of piezoelectric quartz. This is followed by a customary but not shown stage A adapted to provide a regular scale of harmonics of the fundamental Q of said oscillator.

A designates a harmonic selector, or amplification selector, arranged for selecting one of the harmonics generated by oscillator Q. It is to be understood that the term "selector" is used in the customary broad sense according to which, in order to select a frequency in a range, it suffices to select a band of frequencies which contains the said frequency. Consequently, when it is said that the harmonic selected by A is NQ, it is to be understood that along with that harmonic, the selector A can transmit the neighboring harmonic $(N\pm1)Q$, $(N\pm2)Q$, etc,; these neighboring harmonics are eliminated after the frequency change as will be explained below.

A so-called auxiliary generator H is provided; here H designates also the value of the frequency produced by said generator, the generator having means to make its frequency adjustable.

On the other hand, A' designates a high frequency selector, or amplifier selector, having a range to select in the range of the frequencies to be received, the frequency S of the particular signal being considered. It will be defined here also that along with the frequency S, the selector A' can transmit frequencies neighboring to S which will be eliminated after the frequency change, according to the well known method of the superheterodyne receiver.

A first frequency changer is shown at C, to which are brought the frequency H produced by the said auxiliary generator and the frequency NQ selected by the harmonic selector A, and at the outlet of which there appears an intermediate frequency $(H-NQ)$. The output of C leads to the mean frequency selector MF, or amplifier selector, arranged to filter the intermediate frequency $MF=(H-NQ)$, among the frequencies produced by C. The selector MF is for eliminating the frequencies $H-(N\pm1)Q$ derived from the neighboring harmonics $(N\pm1)Q$; these derived frequencies should fall outside of the passband of the selector MF. On the contrary, if the passband of selector A was too large, there could arrive at the frequency changer C a harmonic N'Q of which the derived frequency $H-N'Q$ would fall in the pass-band of the selector MF; however, since the selector A is arranged to eliminate the harmonic N'Q (the image frequency of the frequency NQ), the disadvantage under consideration will not be present. The selector MF can be a filter with a large fixed pass-band or a filter with a narrow adjustable pass-band.

There is a second frequency changer C' to which are brought the frequency H produced by the auxiliary generator and the frequency S of the signal selected by the high frequency selector A', and at the output of which appears an intermediate frequency $H-S$.

A mean frequency selector M'F', or an amplifier selector is arranged to filter the frequency $M'F'=H-S$ among the frequencies produced by C'. This selector can be a filter with large fixed pass-band or a filter with narrow adjustable pass-band.

In a third frequency changer C'', the intermediate frequencies $H-NQ$ and $H-S$ are combined and at its output there is taken out the converted frequency $I=(H-NQ)\pm(H-S)$. The frequencies H and NQ are chosen so that there is obtained $I=S-NQ$, or in other words, the converted frequency I is independent of H.

I designates also a selective circuit adjustable over the converted frequency I; the range covered by this selective circuit called the range of interpolation, has for its extent the value of the frequency of the base generator of harmonics Q. The assembly of usual receiving elements is shown at R and enables the transformation of the converted frequency into sound or images. The assembly of I and R constitutes a receiver for receiving the converted signal at the frequency I.

It may be noted that in the use of the arrangement to measure frequency, the assembly of elements I and R is replaced by a frequency meter F, as indicated on the variant of the several stages of Figure 8.

The numerals 11 through 15 designate the control devices for the adjustment of the harmonic selector, of the auxiliary generator H, of the high frequency selector A', of the mean frequency selector M'F', and of the selective circuit I. In the case where a selector M'F' is a filter with a large fixed pass-band, the adjustment device 14 obviously does not exist. There is a mechanical connection 16 between the control devices 11, 12 and 13, said connection enabling a simultaneous control of these devices. Similarly, a mechanical connection 17 is provided between the control devices 14 and 15, enabling a simultaneous operation of these devices. An apparatus 18 is provided for indicating the operating frequency, which may comprise two drums 19 and 20 connected respectively by the mechanical connections 21 and 22 to the control devices 15 and 12.

Referring now to Figure 8, there is shown by way of example a four-stage unit for measuring frequency at high precision. It is obvious how the component units are made up from previously described units and a similar use of reference numerals is made, so that it will be unnecessary to describe in detail these component units. The receiving antenna 30 is connected by means of a switch device formed of elements $K_1$, $K_2$, $K_3$, $K_4$ to which the high frequency selectors or amplifier selectors $A'_1$, $A'_2$, $A'_3$, $A'_4$ which correspond to the frequency to be measured. The control devices for adjusting the harmonic selector, the auxiliary generator, and the high frequency selector of each stage can be uni-controlled as in case of Fig. 7. Thus, the knob or control device $B_1$ controls simultaneously the adjustment of the harmonics selector $A_1$, the auxiliary generator $H_1$ and the high frequency selector $A'_1$. It controls furthermore the positioning of the drum $T_1$ of the frequency indicating device constituted by the combination of drums $T_1$, $T_2$, $T_3$, $T_4$, T as the drums 19 and 20 constituted the frequency indicating arrangement of the device of Fig. 7. The last drum T is controlled by the knob B, the manipulation of which enables the determination of the value of the frequency $I_4$ led into the frequency meter, F. This latter being for example a bridge frequency meter, wherein the measuring precision in a range of one to two kcs. may easily be of the order of one c./s.; wherefore, the device in Fig. 8 enables the measurement with a precision of that order, of frequencies that may go up to 100,000 kc./s. The intermediate frequency selectors $M'_1$, $F'_1$, $M'_2$, $F'_2$, $M'_3$, $F'_3$, $M'_4$, $F'_4$ are here filters with wide fixed bands within the limits above indicated and the different harmonic generators $Q_1$, $Q_2$, $Q_3$, $Q_4$ each derive their respective fundamental frequencies from the same generator Q with stabilized frequency.

The receiving aerial is naturally connected to the amplifier corresponding to the frequency desired. Each of the local heterodynes can be equipped with a meter which will thus cause the appearance of the different figures of the decimal numbering. Finally, the frequency meter F may be a bridge frequency meter giving without difficulty a precision of one period-second.

What I claim is:

1. A frequency converter arrangement for bringing a signal frequency into a lower frequency range with a high degree of precision, comprising a generator with stabilized frequency, an auxiliary generator with frequency adjustable in a range of the order of magnitude of the range which contains the signal frequency, two frequency changers coupled to combine the frequency of the said auxiliary generator respectively with the frequencies of the signal and of the generator with stabilized frequency and to obtain respectively two intermediate frequencies each different from the component frequencies, and a third frequency changer in which the two said intermediate frequencies are combined to produce the converted frequency, the frequency of the auxiliary generator and that of the generator with stabilized frequency being so chosen that the said converted frequency is independent of the frequency of the auxiliary generator.

2. A frequency converter arrangement according to claim 1, in which the constituent elements aforesaid are adjusted so that the said converted frequency is equal to the sum of the two said intermediate frequencies.

3. A frequency changer device comprised of coupled stages each constituted by a device according to claim 1, in which means is included for coupling each stage to the one following so that the converted frequency produced by said third frequency changer of a stage constitutes the signal frequency of the immediately adjacent stage in the order of decreasing frequencies.

4. A frequency converter device for bringing a signal frequency into a range of much lower frequencies, called interpolation, with a high degree of precision, comprising a generator of harmonics of a stabilized base frequency equal to the range of said range of interpolation, a harmonic selector connected to select one of the harmonics produced by said harmonic generator, an auxiliary generator with a frequency adjustable in a range of the order of magnitude of the range which contains the signal frequency, a high frequency selector to select the signal frequency, two frequency changers connected to combine the frequency of said auxiliary generator with the frequencies selected respectively by the said high frequency selector and the said harmonic selector and to obtain respectively two intermediate frequencies each different from the component frequencies, and a third frequency changer in which the two said intermediate frequencies are combined to produce the converted frequency, said harmonic selector, auxiliary selector and high frequency selector having control devices for adjusting them, the frequency of the auxiliary generator and that selected by the harmonic selector being chosen so that the said converted frequency is independent of the frequency of the auxiliary generator.

5. A frequency converter device according to claim 4, including means for measuring the value of the said converted frequency.

6. A frequency converter device according to claim 4, comprising a selective circuit adjustable in the range of the interpolation range and connected for receiving the said converted frequency.

7. A frequency converter device comprised of coupled stages each constituted by a device according to claim 4, and in which means is included for coupling the third frequency changer of each stage to the high frequency selector of the immediately adjacent stage in the order of decreasing frequencies.

8. A frequency changer device according to claim 4, comprising a selective circuit with control device for adjusting it in the extent of the interpolation range and connected to receive the said converted frequency, and a mean frequency selector with control device for adjusting it in an interval equal to the extent of the interpolation range and adapted to filter the intermediate frequency produced by the frequency changer connected to said high frequency selector, and including means whereby the control devices of the adjustment of the auxiliary generator, of the harmonic selector and of the high frequency selector are mechanically coupled among themselves so as to be simultaneously operated, and means whereby the control devices of the adjustment of said selective circuit and of said intermediate frequency selector are mechanically coupled among themselves so that they can be simultaneously operated.

9. A frequency converter device according to claim 4, comprising a selective circuit with means for modifying its adjustment in the extent of the interpolation range and connected to receive the said converted frequency, and means for indicating the signal frequency with means enabling it to be actuated in part by the means which modifies the adjustment of said selective circuit and in part by the means which modifies the adjustment of said auxiliary generator.

MARCEL COLAS.

REFERENCES CITED

The following references are of record in the file of this patent:

UNITED STATES PATENTS

| Number | Name | Date |
|---|---|---|
| 1,645,850 | Bernhard | Oct. 18, 1927 |
| 2,096,881 | Butler | Oct. 26, 1937 |
| 2,344,813 | Goldstine | Mar. 21, 1944 |
| 2,406,125 | Ziegler et al. | Aug. 20, 1946 |
| 2,406,309 | Ziegler | Aug. 20, 1946 |